Nov. 1, 1966
J. P. BOZNANGO
3,282,460
APPARATUS FOR PREPARING FRIED CHICKEN
Filed May 4, 1964
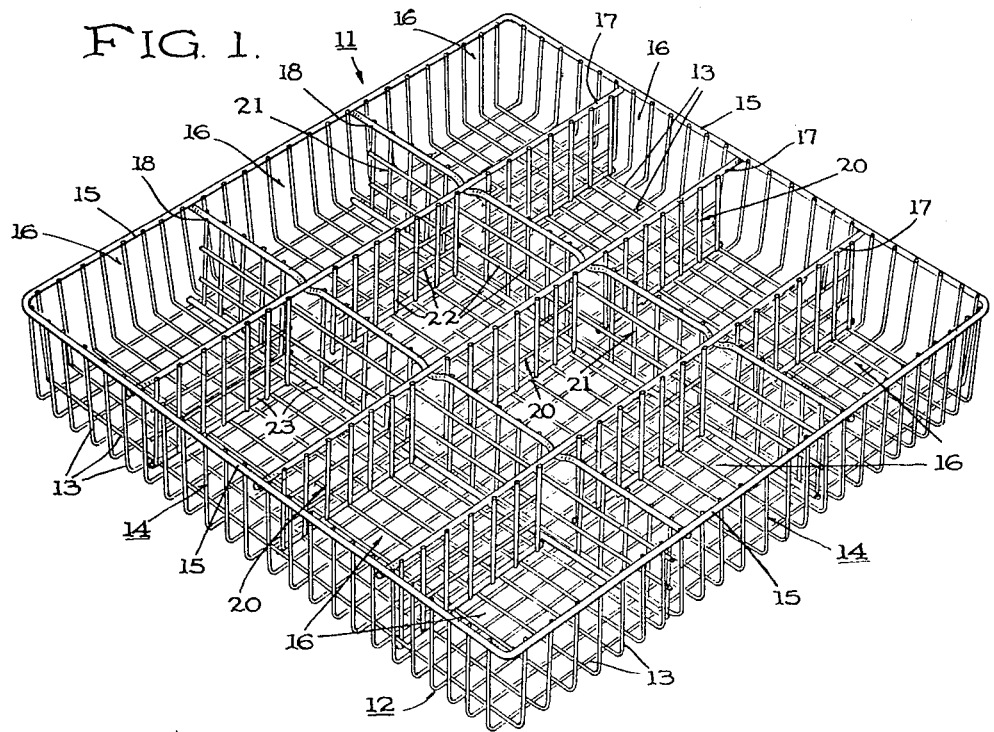
FIG. 1.
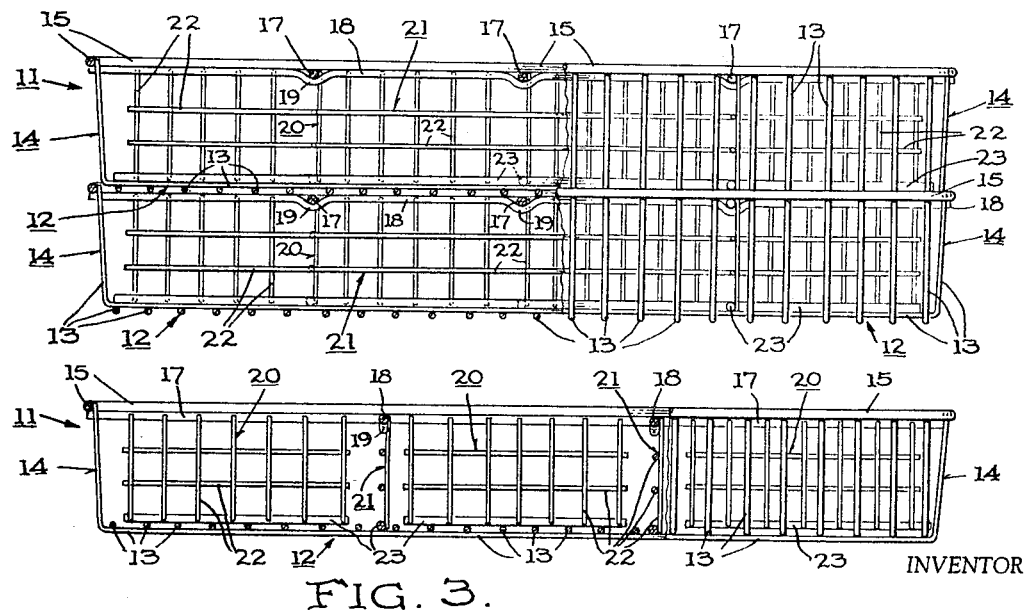
FIG. 2.
FIG. 3.
INVENTOR
JOHN P. BOZNANGO
BY Cameron, Kerkam & Sutton
ATTORNEYS

United States Patent Office 3,282,460
Patented Nov. 1, 1966

3,282,460
APPARATUS FOR PREPARING FRIED CHICKEN
John P. Boznango, Dayton, Ohio, assignor to The Red Barn System, Inc., Dayton, Ohio, a corporation of Ohio
Filed May 4, 1964, Ser. No. 364,523
2 Claims. (Cl. 220—19)

This invention relates to apparatus for preparing fried food, and is directed more particularly to improved equipment for frying chicken in relatively large quantities for service in restaurants and like establishments.

The principal object of the invention is to provide a novel compartmented basket or rack in which standard orders of fried chicken may be prepared in a manner which not only substantially reduces the labor involved, but also materially increases the number of orders that can be prepared in a given time.

In restaurants of the type wherein the apparatus of the present invention finds particular utility, there are two standard types of orders for fried chicken, each comprising four pieces, one order consisting of two thighs, one breast and one back, while the other consists of one leg, one wing, one breast and one back. According to one commonly used procedure, the uncooked pieces of chicken comprising the number of orders on hand are individually breaded and dropped into a deep fryer. While cooking, the pieces must be constantly stirred in order to prevent them from sticking together, and, when done, are dipped out of the fryer manually by means of a strainer. The pieces comprising the individual orders must then be picked out of the strainer and placed on or in a serving plate or other container. This method normally requires five persons to operate one fryer, two persons breading the chicken, one person tending the fryer, and two persons picking out the orders and serving them, and will produce 24 orders every 12 minutes, or 120 orders per hour.

A second known method involves the steps of first breading the chicken and pre-cooking it during periods when business is slack in the restaurant. The pre-cooked pieces are then placed on a pan and stored temperarily in a refrigerator until needed. When business picks up and orders are received, enough pieces to fill the orders on hand are taken out of the refrigerator, dropped individually into the fryer, fried until done, removed from the fryer by means of a strainer, separated according to the orders, and served. Again, the chicken must be stirred throughout the pre-cooking and frying operations, and five persons are required in order to produce 24 orders every 2½ minutes, or 480 orders per hour.

When using the improved apparatus of the present invention, the pieces of uncooked chicken are breaded and then placed in compartmented racks or baskets of novel construction, one order to each compartment, and remain in the baskets without further handling of the individual pieces until they are ready to be served. With this equipment, which is described in detail hereinafter with reference to the accompanying drawings, two persons can cook and serve 48 orders every 2½ minutes, or a total of 1152 orders per hour.

In the drawings, wherein like reference characters indicate like parts throughout the several views;

FIG. 1 is a perspective view of one form of compartmented chicken frying basket embodying the invention;

FIG. 2 is a side view, partially in section and partially in elevation, of one of the baskets shown in FIG. 1, looking from the lower left in said figure, indicating how they may be stacked during cooking and refrigeration; and FIG. 3 is a side view, partially in section and partially in elevation, of the basket shown in FIG. 1, looking from the lower right in said figure.

Referring now to FIGS. 1–3, there is shown therein a novel piece of equipment for frying chicken comprising a foraminous basket or rack 11 substantially rectangular in form and having a grid-like bottom 12 formed of galvanized metal wires 13 the extremities of which extend upwardly at slightly outward angles from the vertical to form the sides 14 of the basket, the upper ends of the wires 13 being secured, as by welding, to a rim member 15 formed of rod or wire stock of substantially greater diameter than the wires 13. For example, each of wires 13 may have a diameter of approximately 1/16″, while the diameter of rim member 15 may be approximately 3/16″. The upper ends of wires 13 are cut off substantially flush with the upper surface of rim 15.

The interior of basket 11 is divided into a plurality of compartments 16 by rods 17 and 18 which extend at right angles to one another and to the sides of rim member 15, and are welded or otherwise secured to the bottom surface of the rim so that the upper surfaces of said rods lie in a plane which is parallel to, but spaced below, the plane of the upper surface of the rim by a distance substantially equal to the diameter of the stock from which the rim is made. As shown best in FIG. 2, each of rods 18 is provided with depressed portions 19 at the intersections with rods 17 so as to pass therebeneath, the depressed portions 19 being welded to the bottom surfaces of rods 17 at the points of intersection. The sides of compartments 16, other than those formed by the sides 14 of the basket, are formed by grid-like, vertically extending dividers 20 and 21 which are secured to and depend from rods 17 and 18, respectively, each of said dividers comprising vertically and horizontally extending wires 22, preferably of the same gauge as wires 13, and a horizontally extending rod 23, preferably of the same gauge as rods 17 and 18, which is secured to the lower ends of the vertical wires 22. The rods 23 are also preferably welded to the wires 13 forming the bottom 12 of the basket, while the upper ends of vertical wires 22 of the dividers are welded to rods 17 and 18.

The compartments 16 are so dimensioned that each of them is large enough to hold the number of average-sized pieces of chicken constituting a standard order with each piece resting on the bottom of the basket and having sufficient space between it and the other pieces in the same compartment to permit free circulation of the hot oil or liquid fat in which the chicken is cooked. For example, when using a standard 18″ deep fat fryer, the rim member 15 of the basket measures approximately 17¼″ x 17¼″, and the basket is divided into twelve compartments each being approximately 5½″ x 4½″ in plan and 2″ deep. Compartments of these dimensions are just large enough to hold four-piece orders of chicken consisting of either two thighs, one breast and one back, or one leg, one wing, one breast and one back. In a basket of this size, the outside dimensions of the bottom 12 are approximately 16¾″ x 16¾″ so that one basket may be stacked on top of another with the bottom of one basket nesting inside the rim member 15 of the basket below and resting on the upper surfaces of compartment-forming rods 17 and 18, as indicated in FIG. 2.

The method of preparing fried chicken when using the apparatus of the present invention may be generally described as comprising the following steps:

(1) Breading the individual pieces of chicken.
(2) Placing in each compartment 16 of the basket 11 the proper number and type of breaded pieces to constitute one order.
(3) Pre-cooking or blanching the chicken while contained in the basket.
(4) Temporarily storing the pre-cooked chicken in a refrigerator while still contained in the basket.

(5) Finish frying the chicken while still contained in the basket.

(6) Removing the fried chicken from the basket and serving according to the orders on hand.

The breading operation is normally carried out during periods when business is slow so that, with a crew of two persons, both can work at the same time. The pieces of chicken are first breaded in flour, then dipped in batter, and then breaded in flour again, after which each of the basket compartments is loaded with the correct number and type of pieces to constitute one order.

After the baskets have been filled with the breaded chicken, three or four baskets may be stacked on top of one another and placed in a carrier or holder of any suitable type. The stacked baskets are then lowered on the carrier into a cooker or deep fat fryer of conventional construction, and the chicken is pre-cooked or blanched for from about 6½ to 8 minutes in hot oil or shortening having a temperature of approximately 290° F. At the end of the pre-cooking period, the baskets are lifted out of the fry pot on the carrier, drained and then stacked in a refrigerator for storage until needed for finish frying and service.

As orders are received, one or more baskets are removed from the refrigerator, placed in the carrier, and again lowered into the fryer where they are finish cooked for approximately 2½ minutes. When the chicken is done, the baskets are lifted out of the fryer, and each order is removed from its individual compartment and placed on a plate, or in a suitable container, for service.

The method of frying chicken which results from use of the apparatus of the present invention is an improvement over prior procedures in a number of respects. By keeping the pieces of chicken in a compartmented basket of the character described throughout the time between breading and serving, handling of the individual pieces is minimized with a consequent material saving in labor. Since each piece of chicken remains in a predetermined position with respect to the others, the fry pot can be loaded to its capacity with an even distribution of weight, and the chicken is able to cook faster than normally because the hot oil or shortening circulates freely around each piece. This procedure also eliminates the constant stirring which is otherwise necessary to prevent the pieces from sticking together, and avoids the loss of breading which occurs due to stirring and the consequent impairment of the looks and taste of the finished product. Frying of the chicken in compartmented baskets also enables less frequent straining of the oil or shortening to remove the breading which is ordinarily knocked off due to stirring and settles in the bottom of the fry pot. Use of the compartmented basket makes it unnecessary to dip the cooked pieces out of the fryer with a strainer, and to then pick out the different pieces comprising an order for serving a customer, and also eliminates the need for a storage pan since each order of chicken remains in its own compartment during the entire operation, including storage. Thus, in general, the apparatus of the present invention enables the production of an order of fried chicken faster, cheaper, and with less labor than is possible with the equipment and methods heretofore known.

Although only one specific form of compartmented basket and certain specific cooking times and other details of the procedure have been described and illustrated herein, it will be obvious that the method of the invention is not limited to the use of the particular equipment and procedural details disclosed. Reference is therefore to be had to the appended claims for a definition of the scope of the invention.

What is claimed is:

1. A stackable compartmented metal basket particularly adapted for cooking orders of fried chicken, each order consisting of a predetermined number of different pieces of chicken, comprising two sets of horizontal laterally spaced wires extending at right angles to one another and lying in substantially the same horizontal plane to form a rectangular grid-like bottom of the basket, the extremities of said wires extending upwardly at slightly outward angles from the vertical to form the sides of the basket, a rim member secured to the upper ends of said wires and forming the top edge of the basket, two sets of horizontal laterally spaced rods extending at right angles to one another and to the sides of said rim member and dividing the interior of the basket into a plurality of compartments, the ends of said rods being secured to the bottom surface of said rim member so that the upper surfaces of said rods lie in a horizontal plane parallel to, but spaced below, the plane of the upper surface of said rim member, the outside dimensions of the bottom of the basket being less than the inside dimensions of said rim member so that one basket may be stacked on top of another with the bottom of one basket nesting inside the rim member of the basket below and resting on the upper surfaces of said rods, and a plurality of vertically extending dividers secured to and depending from said rods and forming in combination with each other and the sides of the basket the walls of said compartments, each of said vertically extending dividers comprising a grid of vertically and horizontally extending wires secured to one another at their intersections and having the upper and lower ends of the vertically extending wires secured to said rods and to the wires forming the bottom of the basket, respectively.

2. A basket as defined in claim 1 wherein the vertically and horizontally extending wires of said vertically extending dividers are welded to one another at their intersections, and including a horizontally extending reinforcing element welded both to the lower ends of said vertically extending wires and to the wires forming the bottom of the basket.

References Cited by the Examiner

UNITED STATES PATENTS

| 813,499 | 2/1906 | Johnson | 220—19 |
| 1,834,273 | 12/1931 | Enock | 220—21 |
| 2,119,890 | 6/1938 | Pease. | |
| 2,239,482 | 4/1941 | Cocks | 220—19 |
| 2,523,272 | 9/1950 | Bluhm | 220—19 |

THERON E. CONDON, *Primary Examiner.*

GEORGE E. LOWRANCE, *Examiner.*